No. 733,818. PATENTED JULY 14, 1903.
G. C. DAVISON.
COMPOUND TURBINE.
APPLICATION FILED NOV. 8, 1901.

NO MODEL. 5 SHEETS—SHEET 1.

Witnesses
Geo. H. Bynce
Stephen Ginsta

Inventor
G. C. Davison.
By Wilkinson & Fisher
Attorneys

No. 733,818. PATENTED JULY 14, 1903.
G. C. DAVISON.
COMPOUND TURBINE.
APPLICATION FILED NOV. 8, 1901.
NO MODEL. 5 SHEETS—SHEET 2.
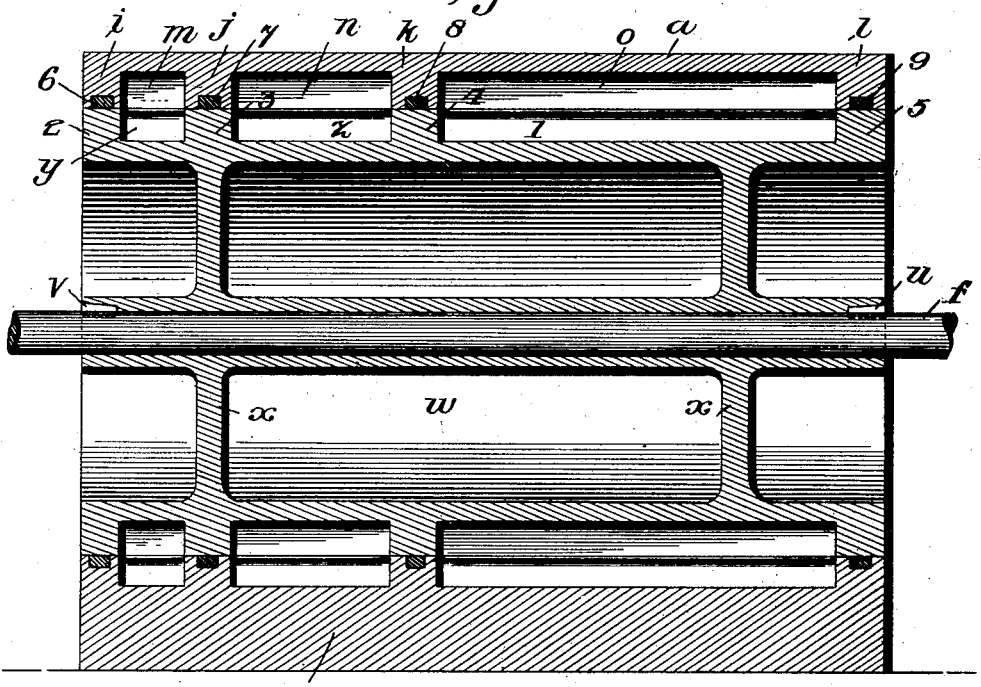
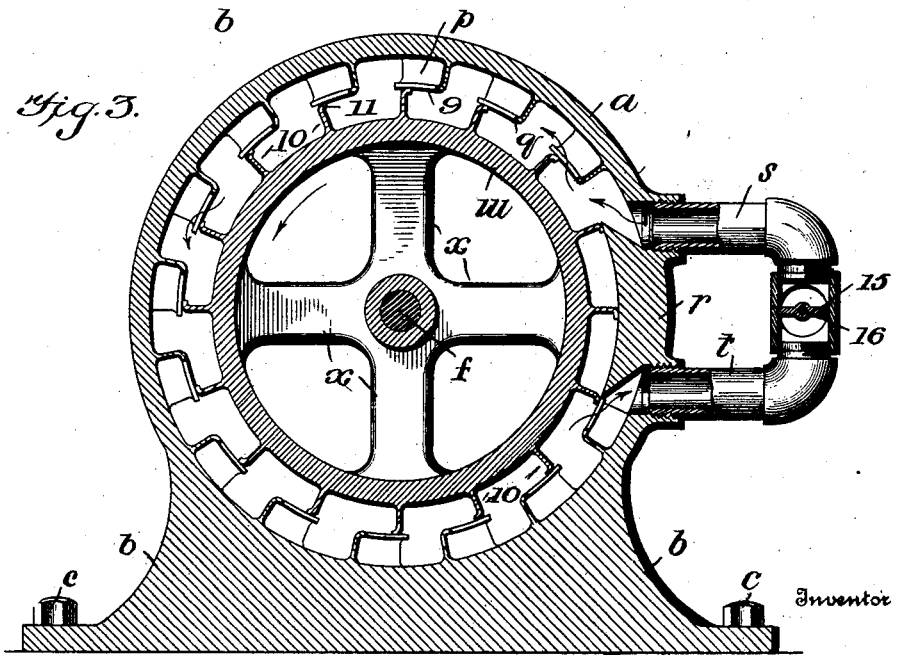

No. 733,818. PATENTED JULY 14, 1903.
G. C. DAVISON.
COMPOUND TURBINE.
APPLICATION FILED NOV. 8, 1901.
NO MODEL.
5 SHEETS—SHEET 3.
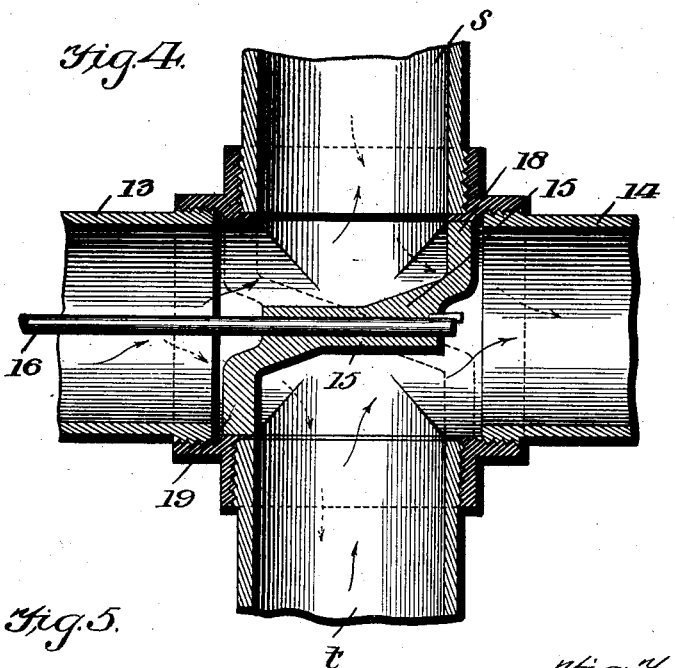
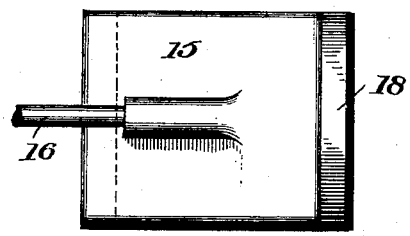
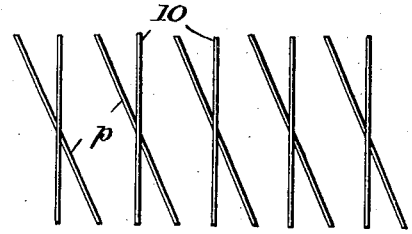
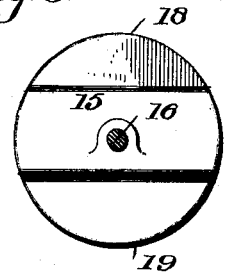
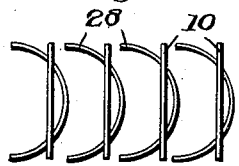
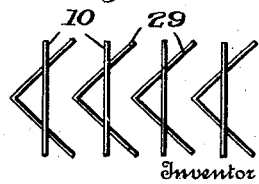
Witnesses
Geo. H. Byrne
Stephen Hinsta
Inventor
G. C. Davison
By Wilkinson & Fisher
Attorneys
THE NORRIS PETERS CO., PHOTO-LITHO., WASHINGTON, D. C.

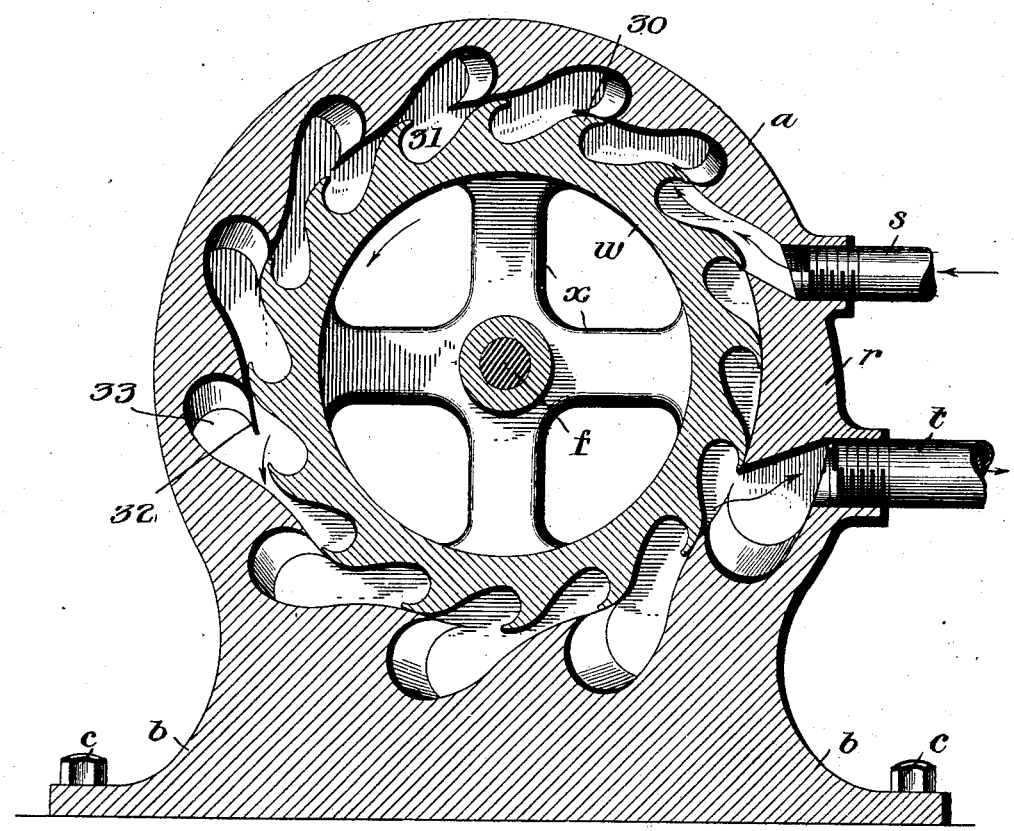

No. 733,818. PATENTED JULY 14, 1903.
G. C. DAVISON.
COMPOUND TURBINE.
APPLICATION FILED NOV. 8, 1901.
NO MODEL. 5 SHEETS—SHEET 5.

Witnesses
Inventor
G. C. Davison
By Wilkinson & Fisher
Attorneys

No. 733,818. Patented July 14, 1903.

UNITED STATES PATENT OFFICE.

GREGORY CALDWELL DAVISON, OF THE UNITED STATES NAVY.

COMPOUND TURBINE.

SPECIFICATION forming part of Letters Patent No. 733,818, dated July 14, 1903.

Application filed November 8, 1901. Serial No. 81,608. (No model.)

*To all whom it may concern:*

Be it known that I, GREGORY CALDWELL DAVISON, a lieutenant in the United States Navy, stationed at Washington, in the District of Columbia, have invented certain new and useful Improvements in Compound Turbines; and I do hereby declare the following to be a full, clear, and exact description of the invention, such as will enable others skilled in the art to which it appertains to make and use the same.

My invention relates to improvements in steam-turbines. While I prefer to use steam as a motive power and to make use of the principle of successive expansion, I do not confine myself to this use, since the turbine may be driven by compressed air or, in fact, by any fluid under pressure.

The object of my invention is to produce a turbine which shall be very simple in construction, cheap, efficient, one that may be run at moderate speed, that has no end thrust, that may be easily and quickly reversed, besides the general advantages incident to the use of other turbines—namely, economy, lightness, and simplicity.

With these objects in view my invention consists in the constructions and combinations of parts, as hereinafter described, and particularly pointed out in the claims.

Figure 1:
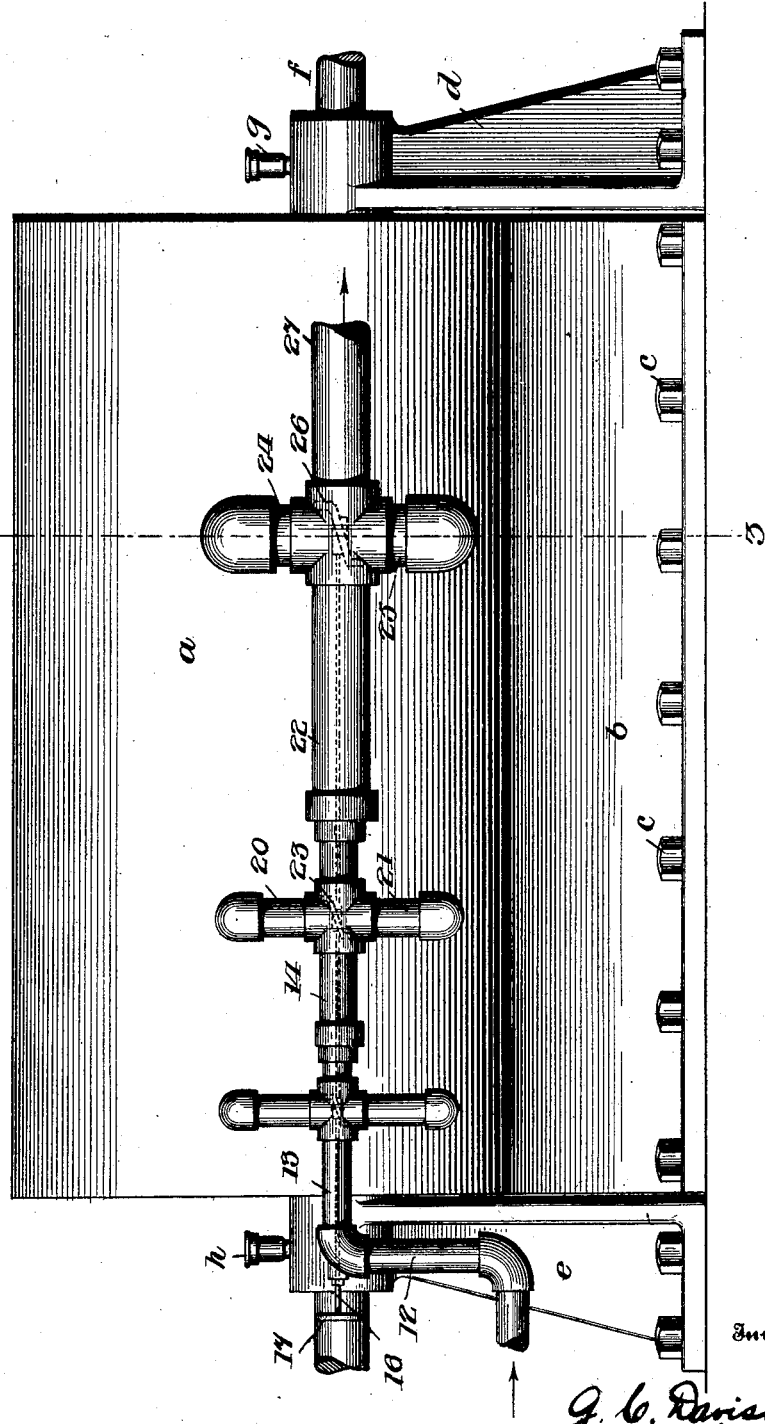
Figure 11:
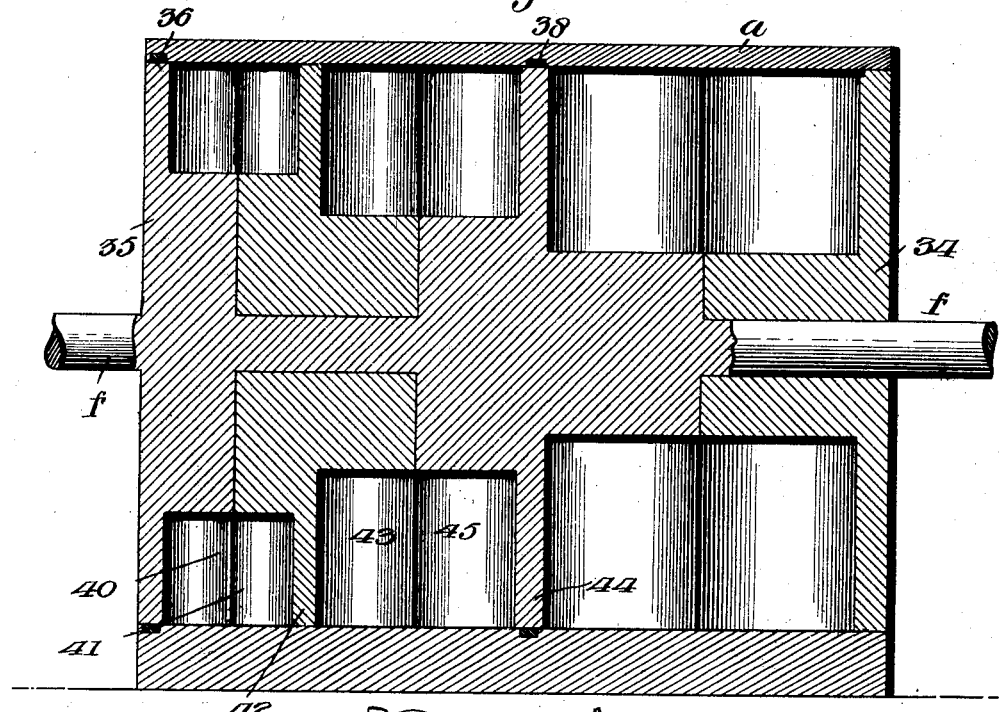
Figure 12:
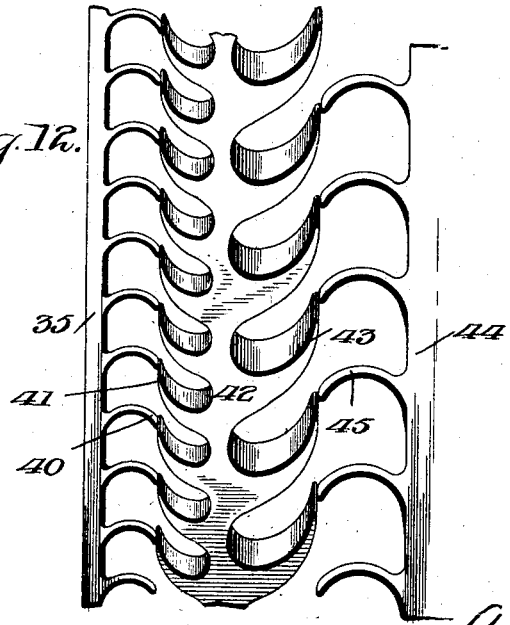

In the accompanying drawings, Figure 1 represents my improved turbine in side elevation. Fig. 2 is a longitudinal section of the same. Fig. 3 is a cross-section of the same on line 3 3 of Fig. 1. Fig. 4 is an enlarged cross-section of the valve and associated parts. Fig. 5 is a top plan view of the valve. Fig. 6 is an end view of the same. Figs. 7, 8, and 9 represent, diagrammatically, the coöperating plates or vanes thereof. Fig. 10 is a cross-section, of modified form, of my device. Fig. 11 is a longitudinal section of still another modification, and Fig. 12 is a detail view showing parts shown in Fig. 11.

$a$ represents a cylinder provided with an enlarged base $b$, fastened to any suitable support by bolts $c$.

$d$ $e$ represent perforated pillars for the support of the shaft $f$, which pillars are provided with the usual oil-cups $g$ and $h$. The cylinder $a$ may be provided with heads and the ordinary stuffing-boxes, if preferred; but these are not necessary.

$i, j, k$, and $l$ represent inwardly-projecting collars on the cylinder $a$, by means of which said cylinder is divided into three compartments $m, n$, and $o$. The compartment $m$ is the one into which steam at a high pressure is admitted, and the pressure diminishes in the successive compartments, which are each made larger than the preceding one. Of course any number of compartments may be used. In the inside of the cylinder are arranged blades or vanes $p$, each having a slight curved portion on its interior. These blades are arranged at an angle to the main shaft $f$. The cylinder $a$ is provided with a portion $r$, which is not provided with blades. The inner side of this solid portion $r$ is curved on the arc of a circle concentric with the inner portions $q$ of the blades or vanes $p$, and this solid portion $r$ is arranged between the inlet-pipe $s$ and the outlet-pipe $t$, so that the steam cannot leak in any appreciable quantities from the inlet-pipe $s$ directly around to the outlet-pipe $t$, but must travel around the internal cylinder before it can escape through the outlet-pipe $t$.

Within the cylinder $a$, mounted on the shaft $f$ and fastened thereto by feathers $u$ and $v$, is a revolving cylinder $w$, supported by spider-arms $x$ on the central shaft. The outer surface of this cylinder is divided into three parallel chambers $y, z$, and 1, successively increasing in size and registering with the chambers $m, n$, and $o$ in the outer stationary cylinder. Collars 2, 3, 4, and 5 are on the outer surface of the cylinder $w$ and serve as boundaries for the chambers $y, z$, and 1 and register with the internal projections $i, j, k$, and $l$. Packing-rings 6, 7, 8, and 9, preferably of metal, are interposed between the collars or projections in the internal and external cylinders to prevent the escape of steam from the chambers. The cylinder $w$ is provided with radial plates or vanes 10, the outer edges of which are curved, as shown at 11. These are arranged at regular distances apart and so that their outer edges will just clear the inner edges of the plates or vanes $p$ when the cylinder $w$ revolves.

It will be noticed from Fig. 7, for example, that as the cylinder $w$ moves and the vanes 10 pass over the plates *p* there will be a passage for the steam open from the inlet-pipe to the exhaust-pipe and that this passage will always remain of the same area notwithstanding the fact that the cylinder *w* moves and the cylinder *a* is stationary.

The steam or other motor fluid is admitted through the pipe 12, whence it passes by the connection 13 into the inlet-pipe *s*. Thence it goes into the first chamber around the cylinder *w*, out through the pipe *t*, and is directed by the valve 15, mounted on the rod 16 and provided with a hand-wheel or other means for turning it, 17, into the pipe 14.
The valve 15 is provided with projections 18 and 19, symmetrically and oppositely arranged on the rod 16, so that when the latter is turned one hundred and eighty degrees the valve will be turned into the position shown in dotted lines in Fig. 4, whereupon the pipe *t* will become the inlet-pipe and the pipe *s* the exhaust-pipe, and the motion of the steam around the cylinder *w*, and therefore the motion of the cylinder itself, will be reversed in direction. The steam passes through the pipe 14 into the inlet-pipe 20, whence it passes through the second chamber, larger than the first, around the cylinder *w*, and out through the outlet-pipe 21, being directed into the pipe 22 by a valve 23, exactly like the valve 15, except that it is larger. From the pipe 22 it passes into the inlet-pipe 24, around the cylinder *w* in the third chamber, which is made larger than the second, into the outlet-pipe 25, from whence it is directed by the valve 26 into the exhaust-pipe 27, although, of course, more chambers than three may be used, if desired.

It should be noted that the inlet and exhaust pipes and the chambers increase in size successively from the first to the last, thus making use of the principle of multiple expansion.

By turning the wheel 17 half-way around the turbine is quickly and easily reversed. The peculiar shape of the valve also, as it is in some respects a balanced valve, makes it an easy and quick operation to reverse the turbine.
It is obvious that the shape of the vanes *p* and 10 may be greatly varied, and in Figs. 8 and 9 I have shown examples of different forms. In Fig. 8, 10 represents the blades on the moving cylinder, and 28 represents the blades or vanes on the stationary cylinder, while in Fig. 9, 10 represents the blades on the cylinder *w*, and 29 represents zigzag plates to be applied to the interior of the cylinder *a* instead of the blades or vanes *p*. Of course it is perfectly obvious that, if desired, the interior cylinder may be made stationary, while the external cylinder revolves.

In Fig. 10 I have shown a cross-section of a modified form of turbine wherein I take advantage of the principle of successive expansions by having the chambers between the inner blades or vanes of the stationary cylinder and the blades or vanes of the revolving cylinder of successively-increasing size from the inlet to the outlet, this form, however, being specially adapted for non-reversible turbines. In this figure, *w* represents the internal rotating cylinder supported on spider-arms *x*, as before. The outer surface of this cylinder is provided with blades 30, concave on one side and convex or curved on the other side, leaving recessed chambers or grooves 31 in the surface of the revolving cylinder. These blades or vanes 30 and chambers 31 are also parallel to the supporting-shaft *f*. The stationary cylinder *a* is provided with internal projecting plates or vanes 32, concaved on one side and convex on the other, but having their concaved portions oppositely arranged in relation to the concaved portions 31 on the rotating cylinder. These plates or vanes 32 being concave of course leave spaces or chambers 33, which gradually increase in size from the inlet-pipe *s* to the outlet-pipe *t*. Moreover, these vanes and the chambers 33, while parallel to the outer surface of the rotating cylinder, are inclined relatively to the axis thereof, as already described in connection with the form shown in Fig. 3. A similar passage, as before, exists between the inlet-pipe *s* and the outlet-pipe *t*, by which the steam can go from the first to the second by passing around the cylinder *w*, and as it does so it of course moves said cylinder. The steam in its passage around the rotating cylinder also expands as it passes from chamber to chamber by reason of the fact that the chambers are successively larger, as already stated.

The modification shown in cross-section in Fig. 10 is of course provided with longitudinally-arranged chambers successively increasing in size, like the arrangement shown in Fig. 2. By having the length of the fixed vanes successively increase in size around the cylinder in one chamber and having the chambers themselves successively increase in size I utilize the principle of multiple expansion in a double manner. Of course the narrower fixed vanes must have on each side of them a solid portion extending up to the walls of the chamber on a circle of the same radius as the part *r*, so that the steam cannot pass around the ends of the vanes.

In Figs. 11 and 12 I have shown a still further modification, in which the plates or vanes are arranged upon the faces of opposing disks instead of upon the inner and outer surfaces, respectively, of opposing cylinders. In this case the outer cylinder *a* is provided with a head 34, and on the rotating shaft *f* is mounted a head 35, which just fits the other open end of the cylinder *a*. Packing-rings 36 and 38, preferably of metal, are used, as before. On the inner face of the head 35 are arranged 13 curved plates or vanes 40, the whole being fastened to the shaft *f*. Opposing the vanes 40, which in this case are made curved, as shown, are the curved vanes 41, held on the stationary partition 42. These vanes 41 are curved in the opposite direction from the vanes 40 and are opposed thereto, a chamber being formed, as shown, inclosing the opposing plates. The other face of the disk 42, which forms a partition, is also provided with curved vanes 43, and on a disk 44, secured to the shaft $f$, are a series of curved vanes 45, these vanes being oppositely curved in respect to the vanes 43 on the disk 42. As shown in Fig. 12, the vanes 43 and 45 are larger than the vanes 40 and 41. On the head 34 is carried a similar series of vanes, which oppose vanes located on the face of the disk 44. The chambers in which these opposing vanes are located increase successively in size, as is evident, from the left to the right.

While I thus have described my invention, I wish it to be especially understood that I do not limit myself to the exact details shown and described, as these may be modified in many respects without departing from the spirit of my invention.

Having thus described my invention, what I claim as new, and desire to secure by Letters Patent of the United States, is—

1. In a steam-turbine, the combination of two oppositely-arranged parts, one stationary and the other movable, and each provided with vanes, said vanes being so inclined relatively to each other as to afford a passage for the motive fluid of constant area between any one of the fixed vanes and the movable vanes at all periods of the revolution of the movable part, and the space between said vanes being divided into chambers increasing in size successively.

2. In a steam-turbine, the combination of an outer cylinder provided with inwardly-projecting vanes, and an inner cylinder provided with outwardly-projecting vanes, said vanes being so inclined relatively to each other as to afford a passage for the motive fluid of constant area between any one of the fixed vanes and the movable vanes, and the space between said vanes being divided into chambers increasing in size successively.

3. In a steam-turbine, the combination of an outer stationary cylinder provided with inwardly-projecting vanes, and an inner revoluble cylinder provided with outwardly-projecting vanes, said vanes being so inclined relatively to each other as to afford a passage for the motive fluid of constant area between any one of the fixed vanes and the movable vanes, and the space between said vanes being divided into chambers increasing in size successively.

4. In a steam-turbine, the combination of an outer cylinder provided with internal vanes, an inner cylinder provided with external vanes, said vanes being so inclined as to afford a passage for the motive fluid of constant area between any one of the fixed vanes and the movable vanes, said cylinders being provided with registering projections dividing the space between them into chambers successively increasing in size, inlets and outlets for said chambers, and means for simultaneously reversing the flow of the motive fluid through said inlets and outlets.

5. In a steam-turbine, the combination of an outer cylinder provided with internal vanes, a portion of said cylinder being unsupplied with vanes, an inner cylinder provided with external vanes, said vanes being so arranged that there is a steam-passage of constant area from the inlet to the outlet pipes, said inlet and outlet pipes being arranged on either side of that part of the outer cylinder which is not provided with vanes, and a valve provided with symmetrically and oppositely arranged projecting portions, whereby the motor fluid may be reversed in direction at will.

6. In a steam-turbine, the combination of an outer cylinder provided with internal vanes arranged parallel to the inner surface of said cylinder but at an angle to the axis thereof, an inner cylinder provided with external vanes arranged radially to said cylinder, and inlet and outlet pipes for said outer cylinder.

7. In a steam-turbine, the combination of an outer cylinder provided with internal vanes arranged parallel to the interior surface thereof but inclined to the axis thereof, said vanes being arranged with their inner surfaces upon a circle and said cylinder being provided with a solid portion extending down to said circle, an inner cylinder provided with radially-arranged vanes, inlet and outlet pipes arranged in proximity to the solid portion of said outlet-cylinder, and a valve located between said inlet and outlet pipes for reversing the flow of steam in said turbine.

8. In a steam-turbine, the combination of an outer cylinder provided with internal vanes arranged parallel to the interior surface of said cylinder but inclined to the axis thereof, said vanes being arranged upon the circumference of a circle, and having their lower parts curved, and said cylinder having an interior solid portion projecting down to said circle, an internal cylinder provided with radially-arranged vanes having their outer edges curved, which outer edges are arranged to contact with said internal vanes, inlet and outlet pipes arranged on either side of said solid portion of the outer cylinder, and a reversing-valve located between said inlet and outlet pipes.

9. In a steam-turbine, the combination of an outer cylinder provided with internal vanes, said vanes being arranged parallel to the inner surface of said cylinder but inclined to the axis thereof and having their lower edges curved and located on the circumference of a circle, said cylinder being provided with a solid portion extending down to said circle, an inner cylinder provided with external radially-arranged vanes, the outer edges of said vanes being curved, registering collars or projections on said cylinders whereby the space between said cylinders is divided into chambers successively increasing in size, inlet and outlet pipes for each of said chambers, and means for simultaneously reversing the flow of the motor fluid in all of said chambers.

In testimony whereof I affix my signature in presence of two witnesses.

GREGORY CALDWELL DAVISON.

Witnesses:
J. STEPHEN GIUSTA,
GUSTAVE R. THOMPSON.